UNITED STATES PATENT OFFICE.

PARKER C. CHOATE, OF NEW YORK, N. Y., ASSIGNOR TO THE ELECTRICAL ZINC COMPANY, OF NEW JERSEY.

PROCESS OF PREPARING SOLUTIONS CARRYING SALTS OF ZINC.

SPECIFICATION forming part of Letters Patent No. 512,362, dated January 9, 1894.

Application filed June 4, 1892. Serial No. 435,493. (No specimens.)

*To all whom it may concern:*

Be it known that I, PARKER C. CHOATE, a citizen of the United States, residing in the city of New York, in the county and State of New York, have invented a new and Improved Process of Preparing Solutions Carrying Salts of Zinc, (Case No. 7,) of which the following is a specification.

My invention relates generally to the preparation of a solution of zinc from its ores and the object of my improvements is to provide a solution of zinc which shall be practically free from those impurities which are associated with the zinc in the ore.

While my process is applicable to the preparation of a solution of zinc from any of its ores, it is more especially valuable as applied to the inferior ores of zinc known as "blendous" or "complex," in which there are associated with the zinc numerous other metals such as gold, silver, copper, iron, lead, antimony, arsenic, bismuth, cadmium, &c. In the preparation of solutions carrying salts of zinc as heretofore practiced, the solution has been formed directly from the ore by treating it with a solvent, either in its natural state or in the form of an oxide or a sulphate after a preliminary desulphurizing roast. The result of such treatment is that the solution being prepared direct from the ore carries besides zinc many other metals in solution, such as iron, aluminium, manganese, magnesium, copper, nickel, cadmium, &c., since it has so far been found impossible to treat the body of an ore carrying zinc with other metals, with a solvent of the zinc constituent, without having some of the other metals in the ore enter into solution with the zinc, in greater or less quantity. It has therefore been attempted to purify such a solution by removing the metals other than zinc therefrom, by the use of precipitants. The precipitation of other metals from a solution in which they are present with zinc so as to obtain a pure solution of zinc is however, extremely difficult, even as a laboratory experiment and has proven utterly impracticable on a commercial scale. By my invention I obviate these difficulties since before the zinc finally enters into solution, I separate from it, or convert into a form insoluble in the solvent used, all those impurities which are associated with the zinc in the ore and at the same time obtain the zinc in a readily soluble form so that I am able to obtain a solution of great purity and of any desired degree of concentration, although I dispense entirely with the use of precipitants.

From the point of view of my process, all substances which would be acted upon by the solvent of the zinc used and therefore enter into the solution, are treated as impurities. To the end, therefore, of obtaining a sulphate solution of zinc of great purity and any desired degree of concentration, my invention consists in first forming a preliminary sulphate solution of the soluble constituents of the ore directly therefrom, then evaporating this solution to recover the contained salts, then heating the product thus obtained to volatilize and drive off the metallic constituents more volatile than zinc and convert those less volatile than zinc into oxides or other insoluble forms, leaving the zinc in the form of an anhydrous sulphate and finally treating this product with water as a solvent to dissolve the anhydrous zinc sulphate and form the solution.

The preliminary sulphate solution which I use may be prepared from the ore in any usual or suitable manner as by first crushing the ore and then, if a sulphide of zinc, submitting it to a sulphate roast to form sulphate salts of the zinc, and then treating it with water as a solvent. If the ore is of such a nature that the zinc will not be converted into a sulphate by roasting, the solution may be formed by treating the ore in the first instance with dilute sulphuric acid as a solvent. In either case the solution formed will contain besides zinc many other metals such as iron, aluminium, manganese, magnesium, copper, nickel, bismuth, cadmium, &c. The insoluble constituents of the ore such as lead, gangue, &c., are allowed to settle out and the solution is then drawn off and heated to evaporate the water and crystallize out the contained salts which will be recovered mostly in the form of hydrated sulphates. This product is then charged into a furnace of the muffle type and of any well known form and heated in a sufficiently oxidizing atmosphere at a temperature of from 500° to 900° Fahrenheit; care being taken not to apply sufficient heat to decompose the sulphate of zinc. I prefer to stir the mass while heating so that the heat may be equally distributed throughout. By this roast the whole mass will be dehydrated; the metallic constituents more volatile than zinc will be volatilized and driven off while the sulphates of those metals which are less readily volatilizable than zinc will be decomposed, the acid passing off as vapor and converted into forms insoluble in water, for the most part oxides. The zinc being less readily decomposable than any of the other soluble metallic sulphates will remain as anhydrous zinc sulphate. After the roast is completed the product is removed from the muffle and when cool is ready for treatment with a solvent of the zinc constituent. It will contain besides anhydrous sulphate of zinc, which will be in a state of fine subdivision very suitable for entering readily into solution, only oxides or insoluble compounds of other metals such as iron, copper, nickel, &c. The mass is now treated with water as a solvent in any usual or suitable form of tank or treating vessel. The sulphate of zinc will be dissolved by the water, while the insoluble compounds or other metals which may be present will be unaffected and will settle in the treating tank leaving a clear solution containing only salts of zinc which is then ready for use and may be drawn off as desired. The sediment remaining in the tank may be afterward treated by any well known smelting process for the recovery of the contained metals.

The advantages of my invention will be readily apparent to those skilled in the art since by means of it I am able to utilize the impure ores of zinc, heretofore discarded at the mines in great quantities as waste products and to prepare therefrom a concentrated solution of the salts of zinc of great purity.

The value of a pure zinc solution is obvious since only from such a solution can a pure precipitated oxide of zinc be prepared or a pure crystallized sulphate of zinc be obtained by evaporation.

In obtaining metallic zinc by electro deposition also such a solution is of the greatest importance since it is essential to the production of a pure electro deposited zinc that the electrolytic solution shall be free from all metals which may be deposited along with the zinc.

Having thus described my invention, what I claim as new, and desire to secure by Letters Patent, is—

The hereinbefore described process of forming a solution carrying salts of zinc which consists in forming a sulphate solution of the soluble elements of the ore and recovering the same therefrom by evaporation and crystallization, heating the crystallized product to drive off the salts of metals more volatile than zinc and convert those less volatile than zinc into compounds insoluble in water and finally treating the mass with water to dissolve the zinc element substantially as and for the purposes set forth.

In testimony whereof I have hereunto subscribed my name this 3d day of June, A. D. 1892.

PARKER C. CHOATE.

Witnesses:
CLARKSON A. COLLINS,
ROBERT SHERIDAN.